United States Patent [19]

Akazawa

[11] 4,268,856
[45] May 19, 1981

[54] BEAM INDEX COLOR TELEVISION RECEIVER

[75] Inventor: Susumu Akazawa, Sakura, Japan

[73] Assignee: Sony Corporation, Tokyo, Japan

[21] Appl. No.: 78,206

[22] Filed: Sep. 24, 1979

[30] Foreign Application Priority Data

Sep. 25, 1978 [JP] Japan .............................. 53-117617

[51] Int. Cl.³ ............................................ H04N 9/24
[52] U.S. Cl. ................................................... 358/67
[58] Field of Search ....................... 358/67, 68, 69, 70

[56] References Cited

U.S. PATENT DOCUMENTS 3,977,022 8/1976 Sunstein ................................ 358/67

FOREIGN PATENT DOCUMENTS 1186067 4/1970 United Kingdom.
1215024 12/1970 United Kingdom.

*Primary Examiner*—Richard Murray
*Attorney, Agent, or Firm*—Lewis H. Eslinger; Alvin Sinderbrand

[57] ABSTRACT

In a beam index color television receiver having the screen of its color cathode ray tube provided with color phosphor elements and index elements adapted to be excited by an electron beam as the latter scans the screen, and in which index signals, resulting from the excitation of the index elements by the beam, are employed to control the gating or switching of color signals for modulating the beam so that, at any instant during the scanning of an image area of the screen in each scanning interval, the electron beam is modulated, or has its beam current determined, by the color signal corresponding to the color phosphor element then being scanned by the beam; a potential applied to the cathode ray tube determining its beam current is controlled so as to maintain constant the level of the index signals during scanning by said beam of a run-in area at the initiation in each scanning interval; and such controlled potential has its level shifted downwardly a predetermined amount to provide a reference potential which is employed as a black signal level for the color signals determining the beam current during scanning of the image area.

12 Claims, 26 Drawing Figures

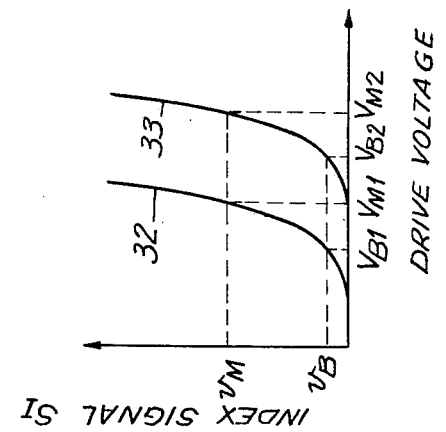
FIG.3
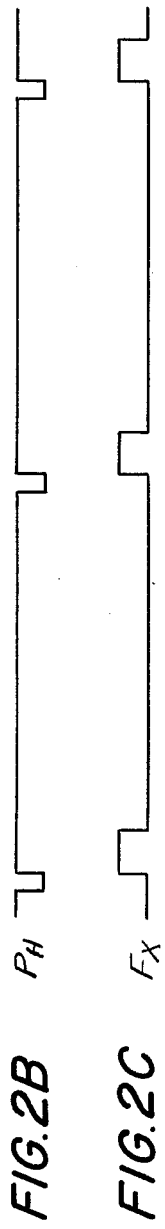
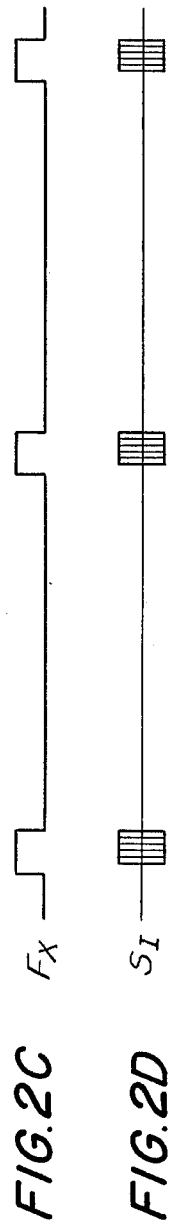
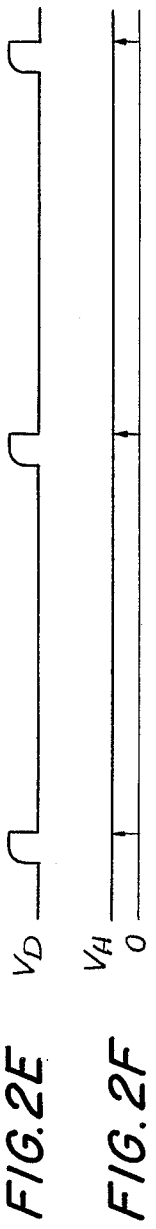
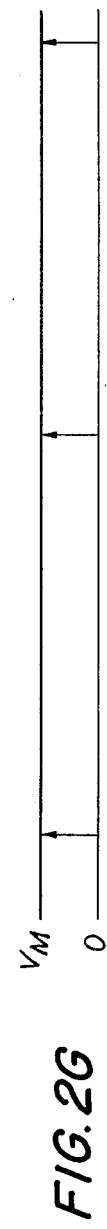
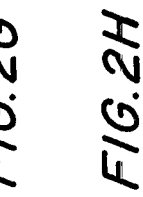
FIG.2A
FIG.2B
FIG.2C
FIG.2D
FIG.2E
FIG.2F
FIG.2G
FIG.2H

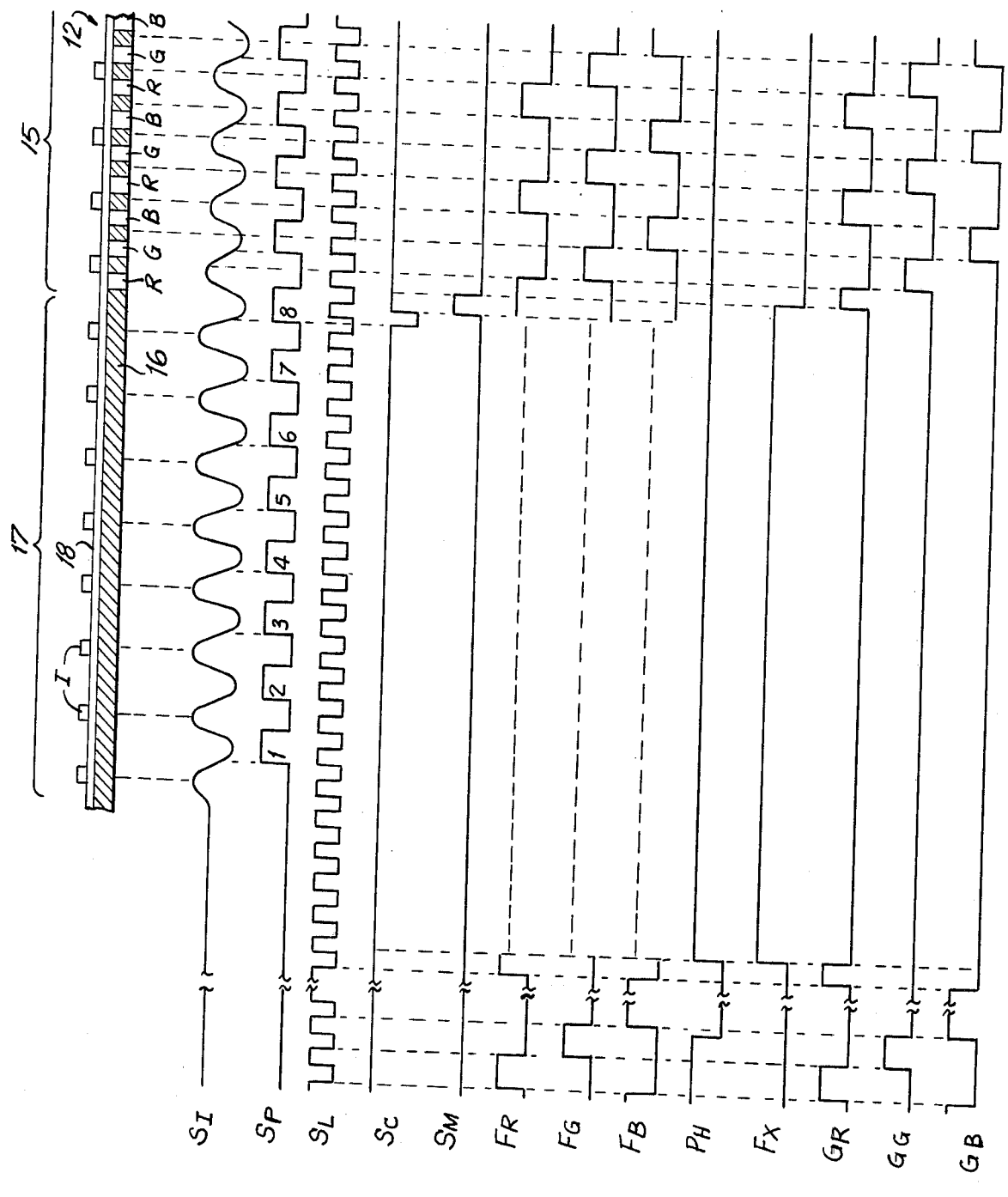

BEAM INDEX COLOR TELEVISION RECEIVER

BACKGROUND OF THE INVENTION

1. Field of the Invention

This invention relates generally to color television receivers, and more particularly is directed to improvements in color television receivers of the type employing a beam index color cathode ray tube.

2. Description of the Prior Art

In existing beam index color television receivers, a single electron beam scans the screen of a color cathode ray tube which, in its image or effective picture area, is provided with triads of red, green and blue color phosphor stripes extending vertically and being sequentially repeated in the horizontal scanning direction. The screen further has, on its inner surface, index phosphor stripes or elements which are spaced apart in the horizontal scanning direction in predetermined positional relation to the triads of color phosphor stripes, and which emit radiant energy when excited by the scanning beam. Such radiant energy emitted by the index elements causes a photo-detector or the like to produce a corresponding index signal which is employed to control the gating or switching of the color signals for modulating the single electron beam. Thus, by reference to the index signal, it is intended that the electron beam should be density-modulated or have its beam current determined by the red, green and blue primary color signals precisely when the single electron beam scans the color phosphor stripes which emit red, green and blue light, respectively.

In order to ensure that the switching of the color signals employed for modulating the single electron beam will be reliably and precisely synchronized with the scanning of the color phosphor stripes or elements by the electron beam, it is necessary that the index signal be always produced regardless of the content of the color video signal being applied to the receiver. However, in the case of existing beam index color television receivers, the electron beam current becomes so low as to provide inadequate excitation of the index phosphor stripes or elements when the applied video signal is at a black level, that is, during the reproduction of a black or dark portion of the television picture, with the result that only a weak or inconsistent index signal is provided and the switching of the color signals cannot be reliably achieved on the basis of such weak or inconsistent index signal. Furthermore, in existing beam index color television receivers, the characteristics, such as, the cut-off level, of the cathode ray tubes may vary from one tube to the next so as to cause undesirable variations and inconsistencies in the index signal obtained at the black level of the video signal. Such variations in the characteristics of the beam index color cathode ray tubes increase the likelihood of encountering an ineffective or unreliable index signal when the received video signal is at the black level.

OBJECTS AND SUMMARY OF THE INVENTION

Accordingly, it is an object of the present invention to provide a beam index color television receiver which avoids the above problems in a relatively simple manner.

Another object of the invention is to provide a beam index color television receiver in which a suitable index signal is always produced irrespective of the content of the received video signal.

A further object is to provide a beam index color television receiver, as aforesaid, in which a minimum value of the electron beam current is stably and positively established so as to ensure the production of an adequate index signal even when the received video signal is at the black level.

Still another object of the invention is to provide a beam index color television receiver, as aforesaid, in which the period of scanning of the run-in area of the screen is utilized during each scanning interval for stably and positively establishing a minimum beam current by which the production of an adequate index signal is ensured irrespective of the content of the received video signal when scanning the image area of the screen.

According to an aspect of this invention, a beam index color television receiver comprises a beam index color cathode ray tube including a screen and means for providing an electron beam adapted to scan the screen during scanning intervals; means for applying a potential to said color cathode ray tube so as to produce a current in the electron beam during a predetermined period in each of the scanning intervals, for example, as the beam traverses the run-in area; means for producing a signal of a level dependent on said beam current, that is, for producing an index signal in response to the scanning of each of the index elements by the electron beam; means for controlling the potential applied to the color cathode ray tube so as to provide a controlled potential which maintains constant the level of the index signal; means for producing a reference potential which is reduced, that is, shifted from the controlled potential in the direction for reducing the beam current; and means for applying color signals to the color cathode ray tube with such reference potential as a reference or black level for the applied color signals during the scanning of the image area by the electron beam.

The above, and other objects, features and advantages of the invention, will be apparent in the following detailed description of an illustrative embodiment which is to be read in connection with the accompanying drawings.

BRIEF DESCRIPTION OF THE DRAWINGS

FIG. 2A schematically illustrates the run-in and effective picture or image areas of the screen of a beam index color cathode ray tube included in the receiver of FIG. 1, and FIGS. 2B-2H are waveform diagrams to which reference will be made in explaining the operation of the television receiver of FIG. 1;

FIG. 3 is a graph showing the relationship of drive voltage to index signal in a beam index color cathode ray tube;

FIG. 4A schematically represents a portion of the cross section of the screen of the beam index color cathode ray tube included in the receiver of FIG. 1, and FIGS. 4B-4N are waveform diagrams to which reference will be made in further explaining the operation of the receiver of FIG. 1;

DESCRIPTION OF A PREFERRED EMBODIMENT

Figure 1:
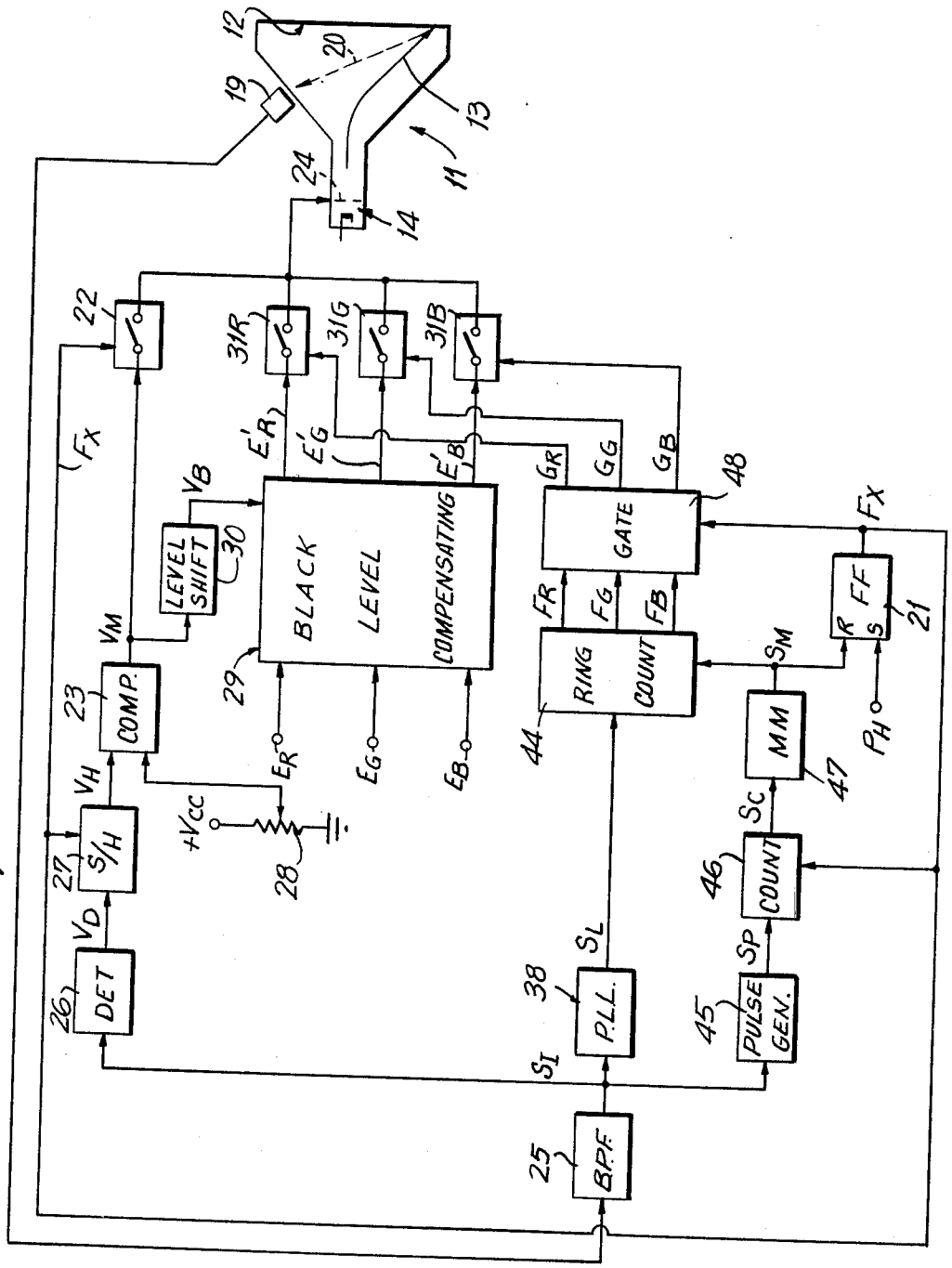
FIG. 1 is a schematic block diagram illustrating a beam index color television receiver according to an embodiment of the present invention.

Referring the drawings in detail, and initially to FIG. 1 thereof, it will be seen that a beam index color television receiver 10 according to the present invention generally comprises a color cathode ray tube 11 of the beam index type having a screen 12 formed on the inner surface of the glass or other transparent face plate or panel of its tube envelope so as to be scanned by an electron beam 13 issuing from a gun structure 14 in the neck of the tube envelope. As shown on FIG. 4A, the screen 12 of beam index color cathode ray tube 11 is comprised of vertically arranged, parallel triads of red, green and blue color phosphor elements or stripes R, G and B which are repeated sequentially in the horizontal scanning direction across an effective picture or image area 15 of the screen. A layer 16 of a suitable black material, such as, carbon or the like, is coated on the inner surface of the face plate of tube 11 between the adjacent color phosphor stripes R, G and B, and at the marginal portions of the face plate or panel around image area 15, which marginal portions include a run-in area 17 scanned by electron beam 13 at the initiation of each horizontal scanning interval. A metallic back layer 18, for example, of aluminum, is thinly coated, as by vapor deposition, over the entire rear surface of screen 12 so as to be effective as a light reflector while being substantially transparent to electrons. Thus, the electron beam 13 can penetrate back layer 18 to excite color phosphor stripes R, G and B, while light emitted from the color phosphor stripes as a result of such excitation is, for the most part, reflected forward toward the viewer rather than being directed into the color cathode ray tube 11.

Index phosphor stripes or elements I extend vertically on the back surface of metallic back layer 18 at locations spaced apart horizontally over both the image or effective picture area 15 and the run-in area 17 of the screen. The index stripes or elements I are arranged in predetermined positional relationships to the color phosphor stripes R, G and B. For example, in the illustrated embodiment, the pitch or spacing between the index elements I is selected to be two-thirds the pitch of the triads of red, green and blue phosphor stripes R, G and B, with the index elements I being located between the adjacent red, green and blue phosphor stripes R, G and B in the image or effective picture area 15.

Returning to FIG. 1, it will be seen that, at the outside of the funnel-shaped portion of the envelope of color cathode ray tube 11, there is provided a photo-detector 19 which is operative to detect light emitted from any one of index elements I, as indicated by the arrow 20 in broken lines, whenever such index element is excited by electron beam 13 scanning the same.

A horizontal synchronizing pulse signal $P_H$ (FIG. 2B), which is suitably separated from the received video signal, is applied to a set terminal S of a flip-flop circuit 21 so that the latter produces an output signal $F_x$ (FIG. 2C) which rises up to a logic level "1" at the trailing or positive-going edge of pulse signal $P_H$. As is hereinafter described in detail, flip-flop circuit 21 is reset at the time when electron beam 13 scans the boundary between run-in area 17 and image area 15, at which time output signal $F_x$ falls down or returns from the high logic level "1" to the low logic level "0", as is apparent from a comparison of FIGS. 2A and 2C. Such output signal $F_x$ from flip-flop circuit 21 controls a switching circuit 22 so that the latter is closed or turned ON only during the period of each scanning interval when signal $F_x$ is at the level "1". As shown in FIG. 1, switching circuit 22 is connected between the output of a voltage comparator 23 and an electrode of cathode ray tube 11, for example, a first grid 24 of gun 14, by which the current of electron beam 13 is controlled. Thus, during the period of each scanning interval when electron beam 13 traverses run-in area 17 of screen 12, an output $V_M$ of comparator 23 is applied through switching circuit 22 to grid 24 for ensuring that a suitable beam current will be achieved for effecting reliable generation of the electron beam 13.

As the reliably generated electron beam 13 scans each index element I in the run-in area 17, the resulting light 20 emitted from the index element is detected by photo-detector 19 which produces a corresponding output signal applied to a band pass filter 25. The filter 25 is designed to pass a frequency band determined by the pitch between the adjacent index elements I and the scanning speed of electron beam 13. More particularly, the output of filter 25 is an index signal $S_I$ of a frequency determined by the pitch between index elements I and the scanning speed of beam 13. Such index signal $S_I$ is applied to an amplitude detector 26 which detects the amplitude of index signal $S_I$ and provides a corresponding detected output voltage $V_D$. Although index signal $S_I$ and detected output voltage $V_D$ are only shown for the periods of scanning of run-in area 17 on FIGS. 2D and 2E, it will be appreciated that such showings are for the sake of clarity, and that the index signal $S_I$ and detected output voltage $V_D$ are, in fact, also produced during scanning of image area 15. The detected output voltage $V_D$ is applied to a sampling and hold circuit 27 which is triggered by the negative going edge of signal $F_x$ (FIG. 2C) so that sampling and hold circuit 27 produces an output voltage $V_H$ (FIG. 2F) of a level corresponding to the detected output voltage $V_D$ from amplitude detector 26 at the termination of the scanning of run-in area 17. Such output voltage $V_H$ from sampling and hold circuit 27 is applied to one input of voltage comparator 23 which, at another input, receives a reference voltage adjustably determined by a variable resistor 28 connected between a power supply terminal $+V_{cc}$ and ground.

The resulting output voltage $V_M$ from comparator 23 has the effect, when applied through closed switching circuit 22 to first grid 24 of the color cathode ray tube during the scanning of run-in area 17, of maintaining constant the electron beam current so as to provide the index signal $S_I$ with a substantially constant amplitude while scanning the run-in area. Thus, a feedback effect is achieved with the reference voltage provided by variable resistor 28 being selected so that a relatively large beam current is attained for ensuring a relatively large index signal $S_I$ in response to scanning of the index elements I in run-in area 17.

In the illustrated beam index color television receiver 10 according to this invention, red, green and blue primary color signals $E_R$, $E_G$ and $E_B$ are suitably demodulated from the received color television signal and are fed to a black level compensating circuit 29. The output voltage $V_M$ from comparator 23 is also shown to be applied to a level shifting circuit 30 in which the output voltage $V_M$ is shifted to a voltage $V_B$ (FIG. 2H) which is lower than the voltage $V_M$ by a constant amount, and which is applied to black level compensating circuit 29. As will be hereinafter described in detail, black level compensating circuit 29 functions to employ the reference voltage or potential $V_B$ as a reference level for the primary color signals $E_R$, $E_G$ and $E_B$ so that such primary color signals cannot go below the reference voltage or potential $V_B$, that is, voltage $V_B$ becomes the black level for compensated primary color signals $E'_R$, $E'_G$ and $E'_B$ issuing from circuit 29. The voltage $V_B$ is selected so that, during the scanning of the image area 15, that is, when the compensated primary color signals are applied to grid 24 of color cathode ray tube 11 for modulating the current of electron beam 13, a sufficient beam current exists, even at the black level of the received video signal, to ensure that the index elements I at the image area 15 of the screen will be sufficiently excited by electron beam 13.

The compensated primary color signals $E'_R$, $E'_G$ and $E'_B$ are selectively applied through switching circuits $31_R$, $31_G$ and $31_B$, respectively, to grid 24 of tube 11 for controlling the beam current of electron beam 13 as the latter scans the respective color phosphor stripes R, G and B in image area 15. More particularly, and as hereinafter described in detail, in response to index signal $S_I$, switching circuits $31_R$, $31_G$ and $31_B$ are repeatedly turned ON in sequence as electron beam 13 scans the respective color phosphor stripes R, G and B distributed across image area 15, with the result that the compensated primary color signals are synchronously applied to the grid 24 of tube 11.

Even in those cases where characteristics of color cathode ray tubes, such as, their cut-off levels, may vary from one tube to the next, the relation of the drive voltage to the cathode current, and accordingly the relation of the drive voltage to the level of the index signal $S_I$, which is sometimes referred to as the $\gamma$ value of the cathode ray tube, are not changed. Therefore, the relationships of the drive voltage to the level of the index signal $S_I$ for several color cathode ray tubes are represented by parallel curves, for example, as indicated at 32 and 33 on FIG. 3. Even if the cut-off levels of the color cathody ray tubes in several television receivers may differ from each other, the output voltage $V_M$ from the comparator 23 is controlled in each receiver so that the level of the index signal $S_I$ obtained during the scanning of run-in area 17 of each screen is constant, as indicated at $v_M$ on FIG. 3. Therefore, even though the output voltage $V_M$ from comparator 23 may be changed from $V_{M1}$ to $V_{M2}$ on FIG. 3 in response to variation of the characteristics of the color cathode ray tube, the voltage $V_B$ from level shifter 30, which is a predetermined or constant voltage less than the output voltage $V_M$, will be changed to $V_{B1}$ or $V_{B2}$. Accordingly, even if the tube characteristics are varied, the amplitude of the beam current flowing when the received video signal is at the black level is not changed so that the level of the index signal corresponding to the black level is constant, as indicated at $v_B$ on FIG. 3. It will be appreciated from the foregoing that, in a color television receiver according to the present invention, a minimum beam current is positively obtained in a reliable and stable manner, with the result that the index signal required for proper switching of the primary color signals is always produced without regard to the contents of the received video signals.

Figure 5:
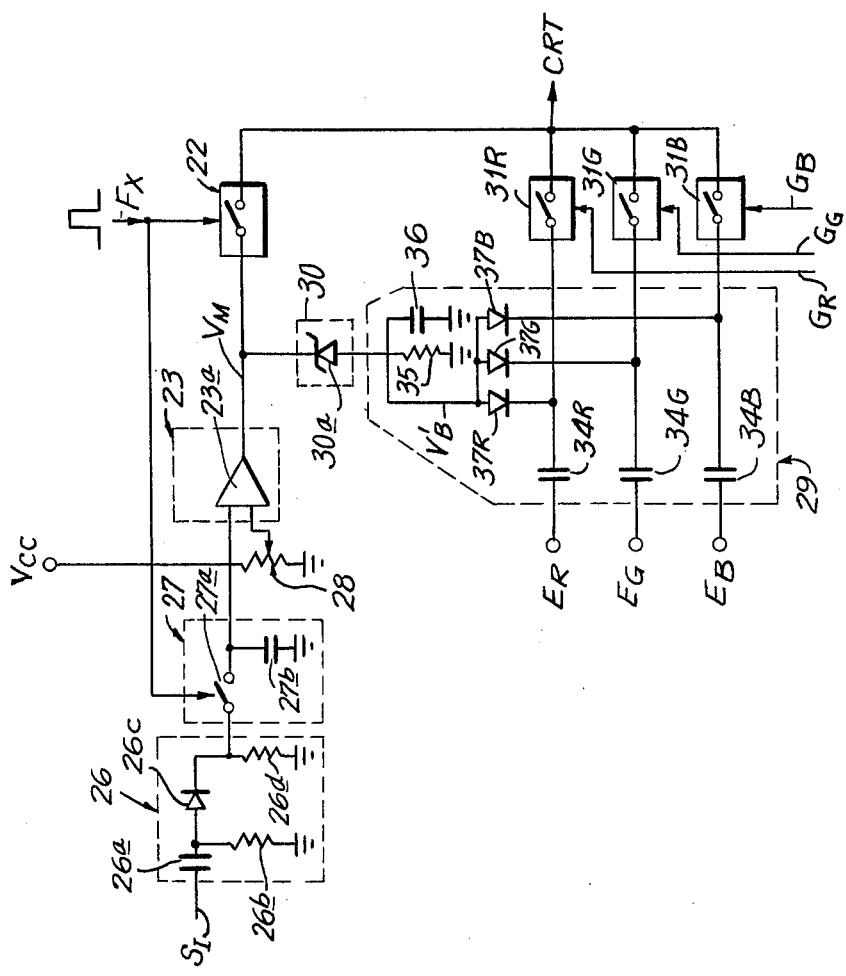
FIG. 5 is a circuit diagram showing, in greater detail, circuits that may constitute some of the components included in the beam index color television receiver of FIG. 1.

Referring now to FIG. 5, it will be seen that, in the beam index color television receiver 10 generally described above with reference to FIG. 1, the detector 26 for amplitude detecting the index signal $S_I$ may be comprised of a series connection of a capacitor 26a and a resistor 26b connected between the output of band pass filter 25 and ground, and a series connection of a diode 26c and a resistor 26d connected between the junction of capacitor 26a with resistor 26b and ground. The output voltage $V_D$ from detector 26 is derived at the junction of diode 26c with resistor 26d, and is sampled by the closing of a switch 27a in the sampling and hold circuit 27 which further includes a capacitor 27b connected between switch 27a and ground and being charged in response to closing of switch 27a. The comparator 23 is shown to be in the form of an operational amplifier 23a having one input connected to the junction of switch 27a with capacitor 27b, while the other input of operational amplifier 23a is connected to variable resistor 28 for receiving the reference voltage therefrom. The level shifting device 30 may be constituted by a zener diode 30a which receives teh output voltage $V_M$ from operational amplifier 23a and provides the respective reference potential $V_B$ to the black level compensating circuit 29.

As further shown on FIG. 5, the black level compensating circuit 29 may be comprised of clamping capacitors $34_R$, $34_G$ and $34_B$ through which the primary color signals $E_R$, $E_G$ and $E_B$ are applied to switching circuits $31_R$, $31_G$ and $31_B$, respectively. The reference potential $V_B$ from zener diode 30a is filtered or stabilized by a filter circuit constituted by a resistor 35 and a capacitor 36, and the resulting stabilized reference potential $V'_B$ which has a predetermined amplitude, is applied through clamping diodes $37_R$, $37_G$ and $37_B$ to the lines connecting capacitor $34_R$ with switch $31_R$, capacitor $34_G$ with switch $31_G$, and capacitor $34_B$ with switch $31_B$, respectively.

As is conventional, the primary color signals $E_R$, $E_G$ and $E_B$ supplied to compensating circuit 29 have the synchronizing or blanking portions of the video signal previously removed therefrom so that the lowest part of the primary color signals are in their trace portions, rather than at the sync tip portions. However, the diodes $37_R$, $37_G$ and $37_B$ and capacitors $34_R$, $34_G$ and $34_B$ cooperate to clamp the blackest parts of the primary color signals to the stabilized reference voltage or potential $V'_B$ with the result that the minimum voltage values of the signals supplied through switching circuits $31_R$, $31_G$ and $31_B$ will be the potential $V'_B$.

Figure 6:
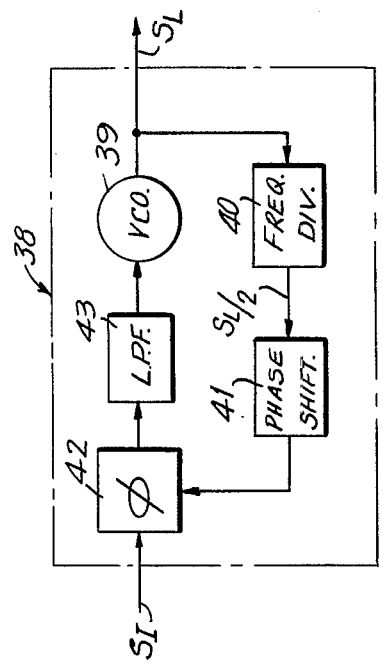
FIG. 6 is a circuit diagram showing, in greater detail, a phase-locked loop included in the receiver of FIG. 1.

Referring again to FIG. 1, it will be seen that, for the purpose of obtaining color switching, that is, controlling the operations of the switching circuits $31_R$, $31_G$ and $31_B$, in beam index color television receiver 10, index signals $S_I$ (FIG. 4B) from band pass filter 25 is supplied to a phase locked loop (PLL) circuit 38 which is operative to provide a signal $S_L$ (FIG. 4D) synchronized with the index signal $S_I$ and having a frequency twice that of the index signal. As shown on FIG. 6, the phase locked loop circuit 38 may include a voltage controlled oscillator 39 providing oscillation pulses with a central frequency which is approximately twice the frequency of the index signal $S_I$, and which are frequency divided by two in a frequency divider 40. The resulting frequency divided pulses $S_{L/2}$ are fed to a phase shifter 41 for phase adjustment. The phase adjusted pulses from phase shifter 41 are fed to a phase comparator 42 to be phase compared therein with the index signal $S_I$ from band pass filter 25. The resulting compared error voltage from phase comparator 42 is applied through a low-pass filter 43 as the control voltage for voltage controlled oscillator 39 which thus produces the pulses $S_L$ phase locked to twice the frequency of index signal $S_I$. The pulses $S_L$ are fed to a distributor 44 which may be in the form of a ring counter providing pulses $F_R$, $F_G$ and $F_B$ at a frequency which is one-third the frequency of pulses $S_L$, that is, two-thirds the frequency of the index signal $S_I$, with the pulses $F_R$, $F_G$ and $F_B$ being sequentially displaced in phase by 120°, as shown on FIGS. 4G, 4H and 4I, respectively.

The index signal $S_I$ from filter 25 is also applied to a pulse generator 45 (FIG. 1) which, in response thereto, produces an index pulse $S_P$ (FIG. 4C) which rises at each zero-crossing point of index signal $S_I$. For example, as shown, index pulse $S_P$ rises at each point where index signal $S_I$ changes from positive to negative. The index pulse $S_P$ is applied to a counter 46 which counts the index pulse $S_P$ during each time period in which the output signal $F_x$ applied to counter 46 from flip-flop circuit 21 is at the high logic level "1". Since flip-flop circuit 21 is set by the horizontal synchronizing pulse $P_H$ at the initiation of a horizontal scan, signal $F_x$ attains its logic level "1" at the initiation of each horizontal scan. Therefore, during the scanning of the index elements I in run-in area 17, the corresponding index pulses $S_P$ are counted by counter 46 up to a predetermined number. Thus, for example, after counter 46 has counted the eighth index pulse $S_P$ which corresponds to the last index element I in run-in area 17, counter 46 produces a negative pulse $S_C$ (FIG. 4E). Such negative pulse $S_C$ is applied to a monostable multivibrator 47 which is triggered by the positive-going or trailing edge of negative pulse $S_C$ to produce a pulse $S_M$ (FIG. 4F) of a width sufficient to achieve the desired timing. The pulse $S_M$ initiated at the positive-going edge of pulse $S_C$ is applied to a reset terminal R of flip-flop circuit 21 so that the latter is reset and its output signal $F_x$ (FIG. 4K) goes down to logic level "0" at the down-going edge of pulse $S_M$ (FIG. 4F).

The pulse $S_M$ from monostable multivibrator 47 is also applied to ring counter 44 so that, as electron beam 13 passes the boundary between run-in area 17 and image area 15, the output pulses from ring counter 44 will be ordered to occur in the sequence $F_R$, $F_G$ and $F_B$. The sequentially repeating pulses $F_R$, $F_G$ and $F_B$ are applied to a gate circuit 48 which also receives output signal $F_x$ from flip-flop circuit 21 so that the pulses $F_R$, $F_G$ and $F_B$ are passed through gate circuit 48 as gate signals $G_R$, $G_G$ and $G_B$, respectively (FIGS. 4L, 4M and 4N) only when signal $F_x$ is at the logic level "0", that is, only during scanning of the image or effective picture area 15. It will be appreciated that the gate circuit 48 may be comprised of three NAND circuits (not shown) having first inputs receiving the pulses $F_R$, $F_G$ and $F_B$, respectively, and second inputs each receiving the signal $F_x$. Thus, for example, the NAND circuit receiving pulse $F_R$ can pass the latter as a respective gate signal $G_R$ only when signal $F_x$ is at the low logic level "0".

The gate signals $G_R$, $G_G$ and $G_B$ are applied to the switching circuits $31_R$, $31_G$ and $31_B$, respectively, so that each of the switching circuits $31_R$, $31_G$ and $31_B$ is turned ON only during the time interval in which the respective gate signal $G_R$, $G_G$ or $G_B$ is at the high logic level "1". Thus, electron beam 13 is density-modulated with the compensated red primary color signal $E'_R$ when beam 13 scans a red color phosphor stripe R, whereas the compensated green and blue primary color signals $E'_G$ and $E'_B$ density-modulate the beam 13 only when the latter scans green and blue color phosphor stripes G and B, respectively.

In the above described embodiment of the invention, the amplitude detector 26 detects the index signal $S_I$ from band pass filter 25 and the detected output $V_D$ is sampled and held in circuit 27 to provide the voltage $V_H$ compared by comparator 23 with the reference voltage from variable resistor 28. However, it will be appreciated that, in accordance with this invention, the output signal from photo-detector 19, rather than the output of band pass filter 25, may be amplitude-detected by detector 26. Further, in accordance with this invention, the index signal $S_I$ from band pass filter 25 or the output signal from photo-detector 19 may be compared, as in comparator 23, with the reference voltage from variable resistor 28, whereupon the compared output of comparator 23 is amplitude-detected and sampled and held to provide the signal $V_M$ to be applied through switching circuit 22 to grid 24 of the color cathode ray tube 11 during scanning of the run-in area 17.

Although the invention has been described above as being applied to a beam index color cathode ray tube 11 in which the pitch of the index elements I is two-thirds the pitch of the triads of red, green and blue phosphor stripes R, G and B, it will be appreciated that the invention can be similarly applied to a beam index color cathode ray tube in which the pitch of the index elements or stripes I is equal to that of the triads of red, green and blue color phosphor stripes, or is an integral multiple thereof. Further, in the above-described beam index color cathode ray tube 11, the boundary between the run-in area 17 and the image or effective picture area 15 has been detected by counting a predetermined number of the index elements I in the run-in area. However, the present invention may also be applied to beam index color cathode ray tubes of the type in which the boundary between the run-in and image areas of the screen is otherwise detected, for example, on the basis of a gap in the array of index elements, or on the basis of a change in the pitch between the index elements.

In any event, it will be appreciated that, in accordance with the present invention, the minimum beam current is stably and positively obtained so that the index signal can be consistently produced irrespective of the contents of the received video signal. In the case where a controlled potential is applied to the grid 24 of tube 11 for ensuring that a constant beam current will be produced during scanning of the run-in area 17, as in the above-described embodiment of the invention, an index signal I of sufficient level is positively produced during the period of scanning of the run-in area so that accurate color switching can be reliably carried out during the remainder of each scanning interval, that is, during the subsequent scanning of the image area 15.

Although an illustrative embodiment of this invention, and several specific modifications thereof, have been described in detail herein with reference to the accompanying drawings, it is to be understood that the invention is not limited to that embodiment and the specifically described modifications thereof, and that various other changes and modifications can be made therein by one skilled in the art without departing from the scope or spirit of the invention as defined in the appended claims.

What is claimed is:

1. A beam index color television receiver, comprising:
   a beam index color cathode ray tube including a screen, means for providing an electron beam adapted to scan said screen during scanning intervals, said screen having an image area and a run-in area contiguous to an edge of said image area and which is scanned by said beam during a predetermined period of each of said scanning intervals, a repetitive pattern of a plurality of groups of color phosphor elements arranged side-by-side across said image area with the elements of each of said groups emitting light of a respective color different from the color of light emitted by the elements of each of the other groups when excited by said beam, index elements spaced apart across said run-in and image areas and emitting radiant energy when excited by said beam, and means responsive to said radiant energy to provide index signals;
   means for applying a potential to said color cathode ray tube so as to produce a current in said beam during said predetermined period of each of the scanning intervals;
   means responsive to said index signals for producing a controlled signal of a level dependent on said beam current;
   means responsive to said level of the controlled signal for controlling said potential so as to maintain constant the levels of said controlled signal during the scanning of said run-in area and said image area, respectively;
   means for producing a reference potential which is shifted from the controlled potential in the direction for reducing said beam current; and
   means for applying color signals to said color cathode ray tube with said reference potential as a reference level for the applied color signals during the scanning of said image area.

2. A beam index color television receiver according to claim 1; in which said color signals include primary color signals occurring in a repeating sequence and respectively corresponding to said groups of color phosphor elements; and said means for applying the color signals includes timing means responsive to the index signals provided during scanning of said image area of the screen by the beam to ensure that each of said primary color signals is effective to modulate said beam simultaneously with the scanning by the latter of a respective one of said color phosphor elements.

3. A beam index color television receiver according to claim 2; in which said means for applying color signals to the tube further includes black level compensating means for employing said reference potential as a black level of said primary color signals.

4. A beam index color television receiver according to claim 3; in which said means for producing a controlled signal of a level dependent on said beam current includes means for detecting the amplitude of said index signals, and means for sampling and holding the detected amplitude of the index signals; said means for controlling said potential includes a source of a predetermined voltage and comparator means comparing said predetermined voltage with the detected amplitude which is sampled and held and providing a controlled potential as a result of the comparison thereof; and said means for applying a potential to the tube includes switch means through which said controlled potential is applied from said comparator means to said tube for determining the beam current during each scanning of said run-in area by the beam.

5. A beam index color television receiver according to claim 4; in which said means for applying a potential to the tube further includes switch control means operative at the commencement of each of said scanning intervals to cause said switch means to apply said controlled potential to said tube, and responsive to said index signals provided during the scanning of said run-in area to cause said switch means to block the application of said controlled potential to said tube at the initiation of the scanning of said image area.

6. A beam index color television receiver according to claim 3; in which said means for producing said reference potential includes level shifting means receiving said controlled potential and providing said reference potential at a predetermined level less than said controlled potential.

7. A beam index color television receiver according to claim 6; in which said level shifting means includes a zener diode to which said controlled potential is applied, and the output of said zener diode constitutes said reference potential applied to said black level compensating means.

8. A beam index color television receiver according to claim 3; in which said black level compensating means includes respective channels for said primary color signals each having a clamping capacitor interposed therein, input means for receiving said reference potential, and clamping diodes through which said reference potential is applied from said input means to said channels, respectively, so as to define said black level for the primary color signals transmitted through the respective channels.

9. A beam index color television receiver according to claim 1; in which a detector is provided for detecting the amplitude of said signal of a level dependent on said beam current, and means are provided for sampling and holding the detected amplitude; said means for controlling said potential includes a source of a predetermined voltage and comparator means comparing said predetermined voltage with said detected amplitude and providing a controlled potential as a result of the comparison thereof; and said means for applying a potential to the tube includes switch means through which said controlled potential is applied from said comparator means to said tube for determining the beam current during said predetermined period of each scanning interval.

10. A beam index color television receiver according to claim 9; in which said means for applying a potential to the tube further includes switch control means operative during said predetermined period at the initiation of each of said scanning intervals to cause said switch means to apply said controlled potential to said tube, and thereafter causing said switch means to block the application of said controlled potential to said tube for the remainder of each scanning interval.

11. A beam index color television receiver according to claim 10; in which said means for producing said reference potential includes level shifting means receiving said controlled potential and providing said reference potential at a level which is a predetermined amount lower than said controlled potential.

12. A beam index color television receiver, comprising a beam index color cathode ray tube including a screen, and means for providing an electron beam which repeatedly scans the screen during successive scanning intervals, said screen having an image area and a run-in area contiguous to an edge of said image area and which is scanned by said beam at an initial period of each of said scanning intervals, said screen including a repetitive pattern of plurality of groups of color phosphor elements arranged side-by-side across said image area with the elements of each of said groups emitting light of a respective color different from the color of light emitted by the elements of each of the other groups when excited by said beam, and index elements spaced apart across said run-in and image area and emitting radiant energy when excited by said beam with the intensity of said radiant energy being dependent on the current in said beam;

means responsive to said radiant energy for providing an index signal of a level dependent on said beam current;

a source of a predetermined voltage;

a comparator means comparing said predetermined voltage with said signal level dependent on the beam current to provide a corresponding controlled potential;

means applying said controlled potential to said tube for determining said beam current and thereby maintaining constant the level of said index signal dependent on the beam current during said initial period of each of said scanning intervals;

means for producing a reference potential which is shifted by a predetermined amount from said controlled potential in the direction for reducing said beam current and which varies with said controlled potential; and means operative during the scanning of said image area in each of the scanning intervals for applying color signals to said color cathode ray tube with said reference potential as a black signal level for the applied color signals, said color signals including primary color signals occurring in a repeating sequence and respectively corresponding to said groups of color phosphor elements, and said means for applying the color signals including timing means responsive to the index signal provided during scanning of said image area of the screen by the beam to ensure that each of said primary color signals is effective to modulate said beam simultaneously with the scanning by the latter of a respective one of said color phosphor elements.

* * * * *